US011444406B2

(12) United States Patent
Klenk et al.

(10) Patent No.: US 11,444,406 B2
(45) Date of Patent: Sep. 13, 2022

(54) WELDABLE POKA-YOKE CONNECTOR

(71) Applicant: Steering Solutions IP Holding Corporation, Saginaw, MI (US)

(72) Inventors: Daniel J. Klenk, Saginaw, MI (US); Delynn Streng, Freeland, MI (US); Mike J. Srda, Birch Run, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 92 days.

(21) Appl. No.: 17/020,029

(22) Filed: Sep. 14, 2020

(65) Prior Publication Data

US 2022/0085543 A1  Mar. 17, 2022

(51) Int. Cl.
*H01R 13/506* (2006.01)
*H01R 13/504* (2006.01)
*B60R 16/02* (2006.01)

(52) U.S. Cl.
CPC ....... *H01R 13/506* (2013.01); *B60R 16/0207* (2013.01); *H01R 13/5045* (2013.01); *H01R 2201/26* (2013.01)

(58) Field of Classification Search
CPC ......... H01R 13/506; H01R 13/5045; H01R 13/642; H01R 13/64; H01R 13/2457; H01R 13/2435; H01R 13/112; B60R 16/0207
See application file for complete search history.

(56) References Cited

U.S. PATENT DOCUMENTS

| 3,059,214 A * | 10/1962 | Heller ................. H01R 13/642 439/336 |
| 10,164,359 B1 * | 12/2018 | Tsai ..................... H01R 13/405 |
| 10,446,975 B1 * | 10/2019 | Johnson .............. H01R 13/112 |

(Continued)

FOREIGN PATENT DOCUMENTS

| CN | 102528255 A | 7/2012 |
| CN | 102916264 A | 2/2013 |

(Continued)

OTHER PUBLICATIONS

Belilove Company—Engineers, 120 Volt Socket Feedthrough, Oct. 23, 2017; Vacuum Feedthroughs, Heating Elements, and Custom Thermal Systems for Aerospace, University Research, Semiconductor, Medical and Other Applications, retrieved from the internet https://belilove.com/article_211_120-volt-socket-feedthrough.cfm.

(Continued)

*Primary Examiner* — Tho D Ta
(74) *Attorney, Agent, or Firm* — Dickinson Wright PLLC (57) ABSTRACT

The present disclosure is for an electrical connector assembly for a vehicle, among other apparatuses known in the art utilizing electrical connectors. The electrical connector assembly is comprised of a connector body and a terminal coupled to the connector body. The electrical connector assembly also comprises a wire harness having a lead. A connector is coupled to the lead and to the terminal, and the connector establishes an electrical connection between the lead and the terminal. The connector and the terminal each have a portion that forms one end of a poka-yoke connection. The connector and the terminal are welded to secure and maintain the respective electrical connection.

13 Claims, 6 Drawing Sheets

(56) References Cited

U.S. PATENT DOCUMENTS

| | | | | |
|---|---|---|---|---|
| 2016/0118739 A1* | 4/2016 | Tomine | ............... | H01R 31/08 |
| | | | | 439/660 |
| 2018/0048792 A1* | 2/2018 | Shiraishi | ............. | H04N 5/2257 |
| 2020/0203870 A1* | 6/2020 | Yin | ....................... | H01R 13/04 |

FOREIGN PATENT DOCUMENTS

| | | | | |
|---|---|---|---|---|
| CN | 203839445 U | | 9/2014 | |
| CN | 209183857 U | | 7/2019 | |
| DE | 102008022371 A1 | * | 11/2009 | ............ H01R 12/52 |
| DE | 102017217332 A1 | * | 3/2019 | |

OTHER PUBLICATIONS

Molex Inc., Sep. 2013, "Imperium Products"; High Voltage/High Current Connector Systems, https://www.tti.com/content/dam/ttiinc/manufacturers/molex/Products/PDF/max-loc-presentation.pdf.

Narva Inc., Mar. 17, 2019, "Ultima L.E.D. Driving Light Harness," retrieved from the internet https://www.narva.com/au/products/74403.

NetEdge BVBA, Dec. 1, 2018, Inventors Guillaume Lavallee and Romain Tursi, "MPO Connector Basics and Best Practices," retrieved from the internet https://www.cablinginstall/home/article/16468511/mpo-connector-basics-and-best-practices.

\* cited by examiner

WELDABLE POKA-YOKE CONNECTOR

BACKGROUND

The following description relates to an electrical connector of a vehicle, and specifically, a weldable poka-yoke connector providing an electrical connection between a circuit card and a wire harness.

Electrical connectors for vehicles and the like are often comprised of separate housings that are engaged through pressure, or "pressure-fit", upon installation. Pressure-fit connectors are desirable because of their ease of installation. However, in order to ensure proper installation, various complexities must be taken into account.

For example, the housings must be securely fastened so that they do not come apart after installation. The wires of the electrical connector must also be properly aligned and securely contacting one another so that an electrical connection is made and maintained. In addition, these electrical connectors are also subject to oxidation over time which often degrades the efficiency of the electrical connection (i.e., the electrical signal is slower and/or weaker).

To overcome the above issues, many have employed connector position assurance (CPA) mechanisms. CPA mechanisms are external devices used to assure locking and/or positioning of connector housings. Accordingly, use of a CPA mechanism often leads to further difficulties when designing a connector and causes greater difficulties during assembly. With respect to connector design, use of a CPA mechanism requires substantial space (relative to packaging components of a vehicle) around the electrical connector. Accordingly, electrical connectors are unavailable for packaging in a confined space.

To overcome some of the above challenges, efforts have been made to utilize direct welding of electrical connectors, multi-pin/contact electrical connectors and/or multi-conductor electrical connectors, and/or locking mechanism, and/or routing or dressing of the wires (individually or in a bundled harness form). These electrical connectors, however, still include one or more of the issues described above in addition to increasing part count, manufacturing complexity and cost.

Therefore, improvements are sought for an electrical connector that is positioned with ease and precision, is cost efficient, and minimizes part count.

SUMMARY

This disclosure relates generally to an electrical connector assembly for a vehicle, among other apparatuses known in the art utilizing electrical connectors.

In an aspect of the disclosed embodiments, an electrical connector may comprise a connector body and a terminal coupled to the connector body. The electrical connector assembly may also comprises a wire harness having a lead. A connector may be coupled to the lead and to the terminal, and the connector may establish an electrical connection between the lead and the terminal. The connector and the terminal may each have a portion that forms one end of a poka-yoke connection. The connector and the terminal may be welded to secure and maintain the respective electrical connection.

In an another aspect of the disclosed embodiments, an electrical connector may comprise a connector body and a male terminal coupled to the connector body. A female terminal may also be coupled to the connector body and may be spaced from the male terminal. The electrical connector may also comprise a wire harness with a male lead and a female lead. A male connector may couple to the male lead and to the male terminal to establish an electrical connection between the male lead and the male terminal. A female connector may couple to female lead and to the female terminal to establish an electrical connection between the female lead and the female terminal. The respective connectors and terminals may each have a portion that forms one end of a poka-yoke connection. The respective connectors and terminals may also be welded to secure and maintain the respective electrical connections.

In accordance with another aspect of the disclosed embodiments, a method of forming an electrical connector is disclosed. The method may comprise the steps of: providing a connector body and a terminal coupled to the connector body; providing a wire harness comprising a lead and a connector coupled to the lead; providing each of the terminal and the connector with portions forming an end of a poka-yoke connection; aligning, by the ends of the poka-yoke connection, the connector with the terminal; coupling the connector with the terminal to establish an electrical connection; and welding the connector to the terminal to secure the electrical connection.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative of the invention that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
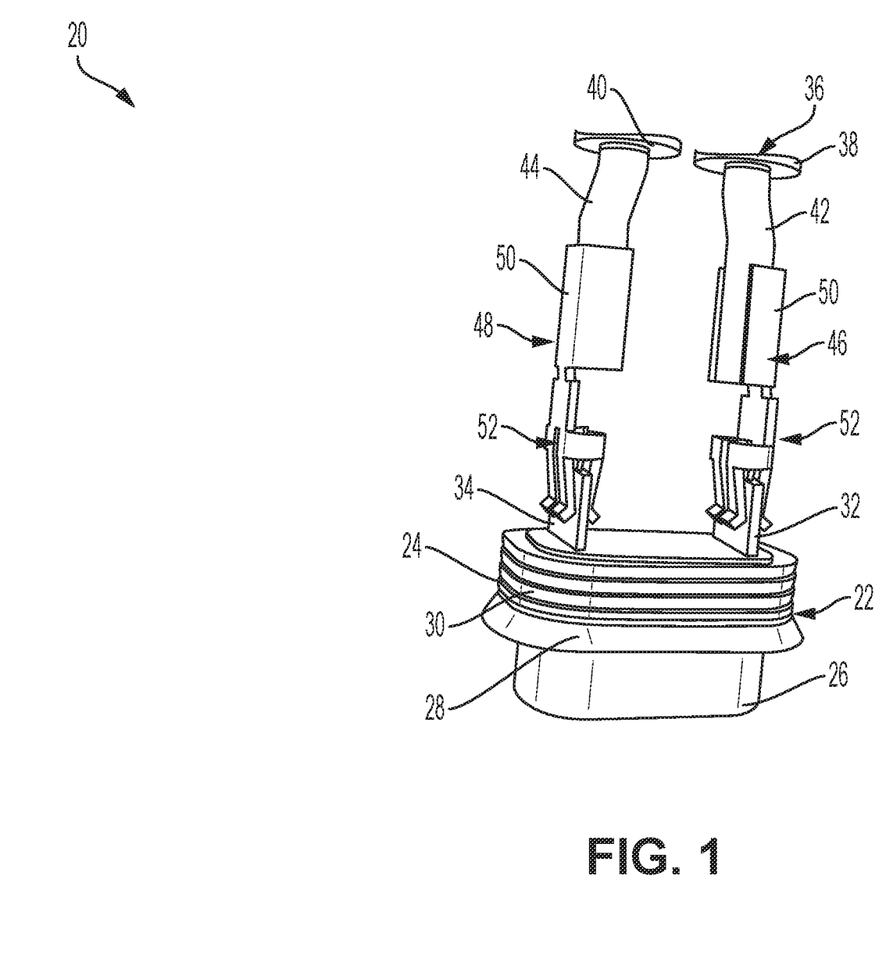
FIG. 1 is a perspective view of an electrical connector assembly.
Figure 2:
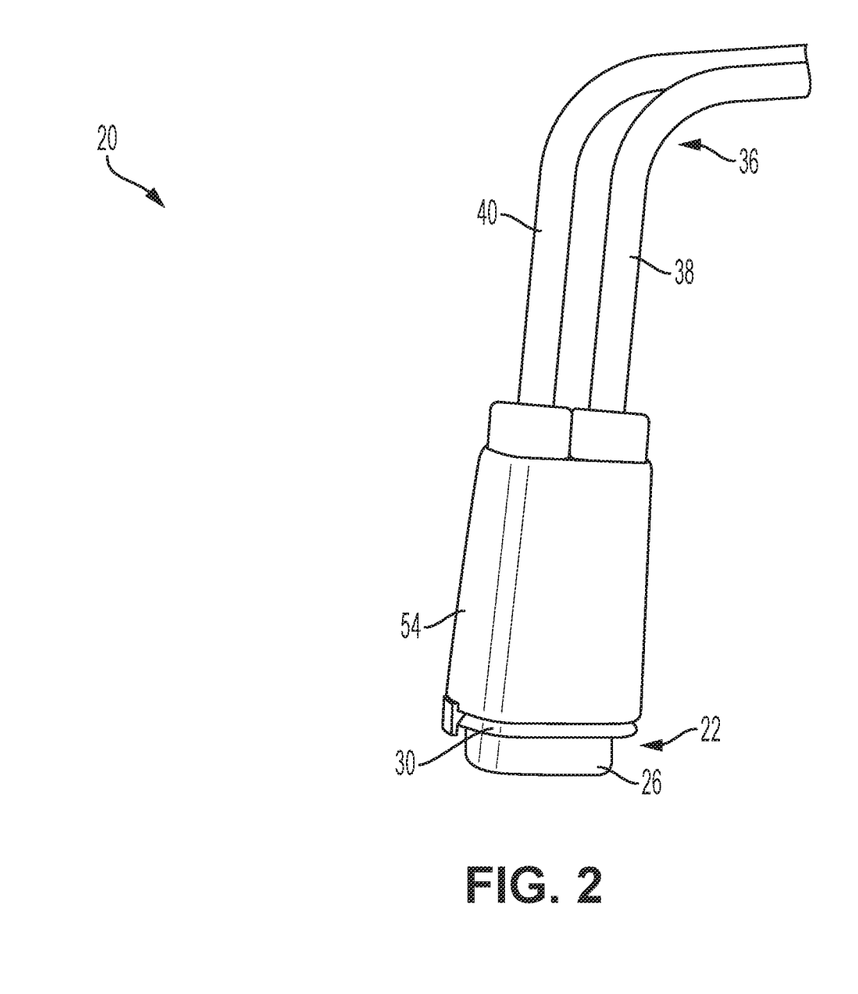
FIG. 2 is a perspective view of the electrical connector assembly shown a cover.

With reference to FIGS. 1 and 2, an electrical connector assembly 20 may comprise a connector body 22. The connector body 22 has an upper portion 24 and a base 26 opposite the upper portion 24. The upper portion 24 may also define a ledge 28 have a seal 30 disposed about a perimeter of the connector body 22 between the upper portion 24 and the ledge 28. The seal 30 may be integral with or coupled to the connector body 22.

In some embodiments, the connector body 22 may couple to a circuit board. In some embodiments, the connected body 22 may be a header and comprise a series of pins (not illustrated in the FIGS.) in electrical communication with the circuit board. In some embodiments, the connector body 22 may couple to a battery terminal. It should be appreciated the electrical connector may be integral with or couple to any number of electrical components known in the art.

In some embodiments, a terminal may be coupled to the connector body 22. In some embodiments, and as illustrated in the FIGS., a male terminal 32 and a female terminal 34 may be coupled to, or integral with, the connector body 22. The female terminal 34 may be spaced from the male terminal 32.

In some embodiments, the electrical connector assembly 20 may comprise a wire harness 36. The wire harness may comprise a male lead 38 and a female lead 40. The male lead 38 may have a male lead end 42, and the female lead may have a female lead end 44. Male and female connectors 46, 48 may couple to respective lead ends 42, 44 and terminals 32, 34 to establish an electrical connection between the leads 38, 40 and the terminals 32, 34.

The connectors 46, 48 may each have a clamp end 50 coupled to the respective lead ends 42, 44. In the embodiment illustrated in FIG. 1, the clamp end 50 has a cross-section of a c-shape and may be clamped to the lead ends 42, 44. It should be appreciated that the clamp end 50 may have any cross-section configuration and may couple to the lead ends 42, 44 by being welded to, clamped/crimped to, or being integrally formed with the lead ends 42, 44.

In some embodiments, the respective connectors 46, 48 and terminals 32, 34 each have a portion that forms an end of a poka-yoke connection. As used herein, a poka-yoke connection means an error proof connection. That is, a connection cannot reasonably be made between the respective connectors 46, 48 and terminals 32, 34 without causing damage to one of the connectors 46, 48 or terminals 32, 34. The poka-yoke connection is advantageous because it prevents an improper connection from being made during assembly.

In some embodiments, the portion of each connector 46, 48 that forms one of the ends of the poka-yoke connection comprises fingers 52 disposed opposite the clamp end 50. The fingers 52 are arranged to provide a pressure-fit connection with the terminals 32, 34. The use of the fingers 52, in combination with the specific terminals 32, 34, provide minimal resistance (i.e., an easy-fit connection) when proper ends of the poka-yoke connection are coupled to one another.

In some embodiments, the respective connectors 46, 48 and terminals 32, 34 are welded to secure and maintain the respective electrical connections. By welding the connectors 46, 48 and terminals 32, 34, the electrical connection is less likely to be effected by corrosion and/or breaking. When employed in a vehicle, the poka-yoke connection in combination with the easy-fit connection facilitates the placement of a circuit board in a confined space, and for the wire harness to be electrically connected at a later stage in assembly. Adding the wire harness at a later stage of vehicle assembly, the wire harness does not obstruct or interfere with the assembly of other vehicle components. In addition, the electrical connection is not disrupted by assembly of other vehicle components.

In some embodiments, the electrical connector assembly 20 may comprise a cover 54 coupled to the leads 38, 40. The cover 54 may connect to the connector body 22 to seal the electrical connection between the connectors 46, 48 and the terminals 32, 34 from an external environment. For example, the cover 54 shields the electrical connection from water and debris to preserve the integrity of the electrical connection. The cover 54 may have an inner surface that defines a slot 56 and a cover lip 58. The cover lip 58 may engage the ledge 28 to secure the cover 54 to the connector body 22, and the slot 56 may engage the seal 30 to facilitate the sealed connection between the cover 54 and the connector body 22.

Figure 3:
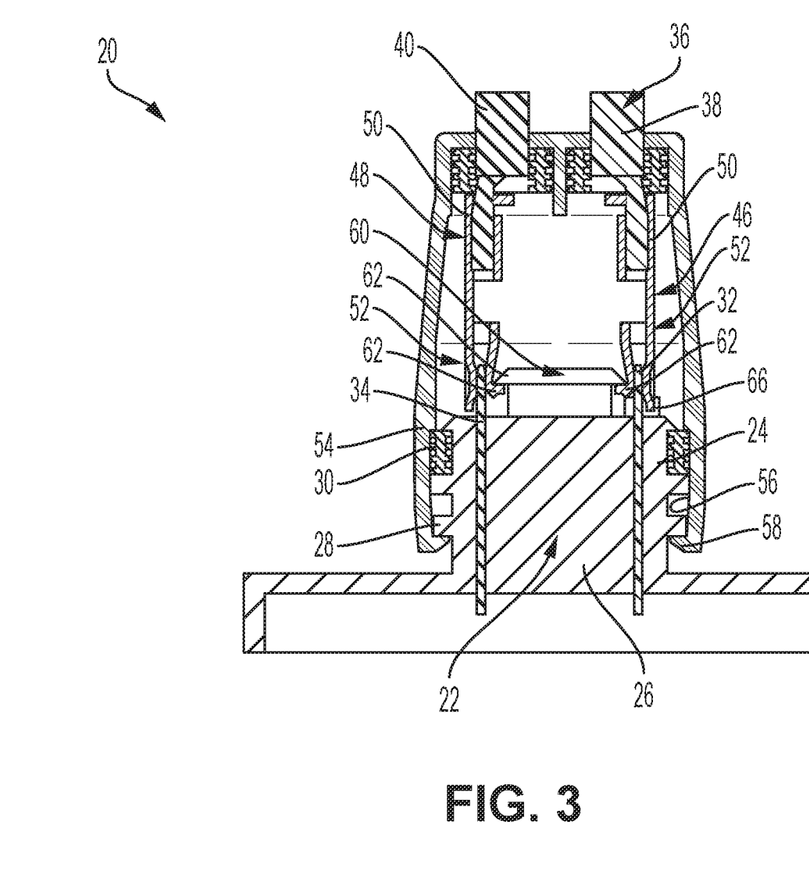
FIG. 3 is a side view of an electrical connector assembly.

In some embodiments, such as the embodiment illustrated in FIG. 3, the connector body 22 may further comprise a projection 60 and a shelf 62. In addition, the fingers 52 may comprise a hook end 64 that engages the shelf 62 when the fingers 52 are connected to the terminals 32, 34. The hook end 64 and the shelf 62 provide a snap-lock connection between the fingers and the connector body 22. This snap-lock connection may also apply additional pressure to the pressure-fit between the fingers 52 and the terminals 32, 34 to maintain the electrical connection.

In some embodiments, such as the embodiment illustrated in FIG. 3, a first terminal key 66 extends from the connector body 22 and is disposed about the male terminal 32. The first terminal key 66 is designed to receive one or more of the fingers 52 of the male connector 46. Although not illustrated, a second terminal key may extend from the connector body 22 and be disposed about the female terminal 34. Like the first terminal key 66, the second terminal key may be designed to receive one or more of the fingers 52 of the female connector 48.

Figure 4:
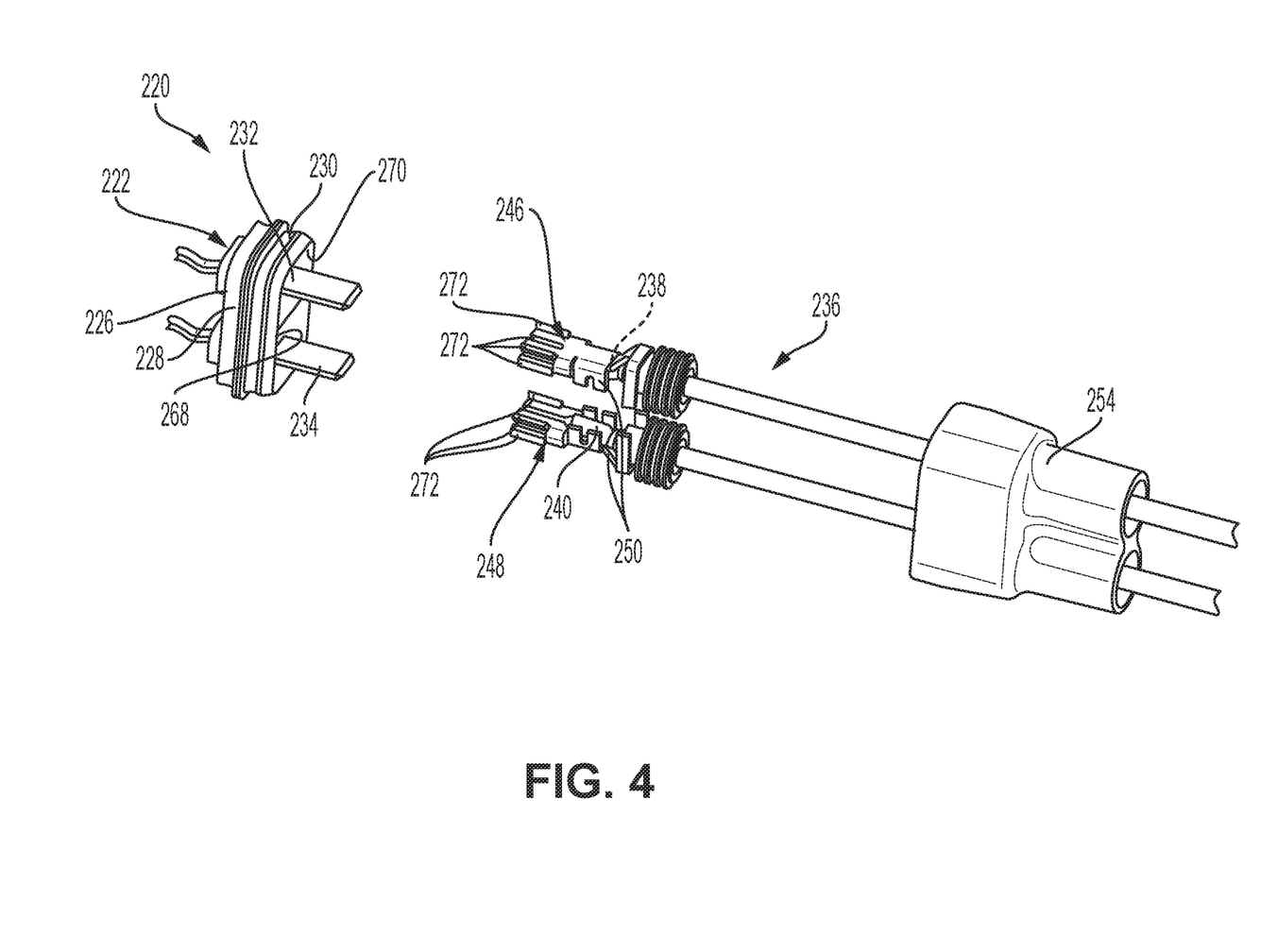
FIG. 4 is a perspective, partially exploded view, of an electrical connector assembly.
Figure 5:
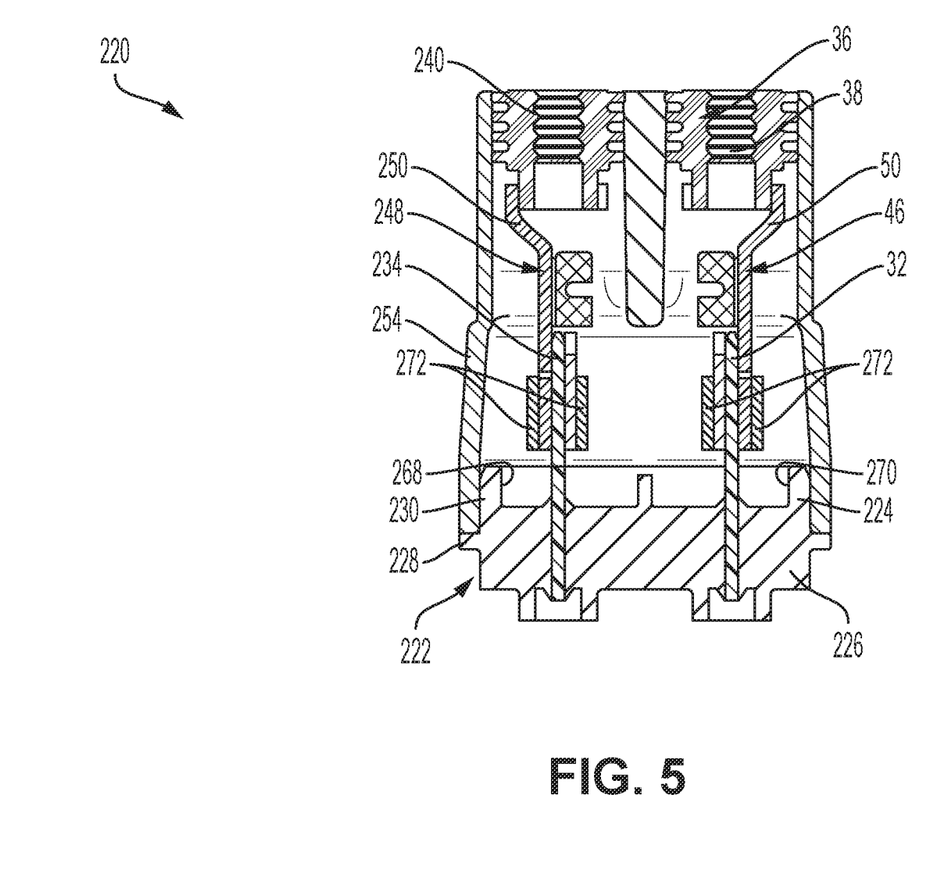
FIG. 5 is a side view of the electrical connector assembly of FIG. 4.

In some embodiment, such as the embodiment illustrated in FIGS. 4 and 5, an electrical connector 220 may comprise a connector body 222. Like connector body 22, connector body 222 has an upper portion 224 and a base 226 opposite the upper portion 224. The upper portion 224 may also define a ledge 228 have a seal 230 disposed about a perimeter of the connector body 222 between the upper portion 224 and the ledge 228. The seal 230 may be integral with or coupled to the connector body 222.

In some embodiments, the connector body 222 may couple to a circuit board. In some embodiments, the connected body 222 may be a header and comprise a series of pins (not illustrated in the FIGS.) in electrical communication with the circuit board. In some embodiments, the connector body 222 may couple to a battery terminal. It should be appreciated the electrical connector may be integral with or couple to any number of electrical components known in the art.

In some embodiments, a terminal 232, 234 may be coupled to the connector body 222. In some embodiments, and as illustrated in the FIG. 4, a male terminal 232 and a female terminal 234 may be coupled to, or integral with, the connector body 222. The female terminal 234 may be spaced from the male terminal 232.

In some embodiments, the electrical connector assembly 220 may comprise a wire harness 236. The wire harness may comprise a male lead 238 and a female lead 240. The male lead 238 may have a male lead end, and the female lead 240 may have a female lead end. Male and female connectors 246, 248 may couple to respective leads 238, 240 and terminals 232, 234 to establish an electrical connection between the leads 238, 240 and the terminals 232, 234.

The connectors 246, 248 may each have a clamp end 250 coupled to the respective leads 238, 240 at ends of each lead 238, 240. In the embodiment illustrated in FIGS. 4 and 5, the clamp end 50 has a cross-section of a c-shape and may be clamped to the leads 238, 240. It should be appreciated that the clamp end 250 may have any cross-section configuration and may couple to the leads 238, 240 by being welded to, clamped/crimped to, or being integrally formed with the leads 238, 240.

In some embodiments, the respective connectors 246, 248 and terminals 232, 234 each have a portion that forms an end of a poka-yoke connection. That is, a connection cannot reasonably be made between the respective connectors 246, 248 and terminals 232, 234 without causing damage to one of the connectors 246, 248 or terminals 232, 234. The poka-yoke connection is advantageous because it prevents an improper connection from being made during assembly.

In some embodiments, and as illustrated in FIGS. 4 and 5, male and female keys 268, 270 recessed into and about a respective male and female terminal 232, 234. The male and female keys 268, 270 are configured to receive a respective male or female connector 246, 248 and to establish a press-fit connection. In some embodiments, the connectors 246, 248 may each have an end including one or more key projections 272 that are received by a respective male or female key 268, 270. One of skill in the art will readily appreciate that the projections 272 may be of any shape, size, or other characteristic in order to establish the poka-yoke connection between the respective connectors 246, 248 and terminals 232, 234.

In some embodiments, the respective connectors 246, 248 and terminals 232, 234 are welded to secure and maintain the respective electrical connections. By welding the connectors 246, 248 and terminals 232, 234, the electrical connection is less likely to be effected by corrosion and/or breaking. When employed in a vehicle, the poka-yoke connection in combination with the easy-fit connection facilitates the placement of a circuit board in a confined space, and for the wire harness to be electrically connected at a later stage in assembly. Adding the wire harness at a later stage of vehicle assembly, the wire harness does not obstruct or interfere with the assembly of other vehicle components. In addition, the electrical connection is not disrupted by assembly of other vehicle components.

In some embodiments, the electrical connector assembly 220 may comprise a cover 254 coupled to the leads 238, 240. The cover 254 may connect to the connector body 222 to seal the electrical connection between the connectors 246, 248 and the terminals 232, 234 from an external environment. For example, the cover 254 shields the electrical connection from water and debris to preserve the integrity of the electrical connection. The cover 228 rest on the ledge 228 and the cover 228 forms a press-fit about the connector body 22. The cover 254 to the connector body 222, and the slot 256 may engage the seal 230 to facilitate the sealed connection between the cover 254 and the connector body 222.

Figure 6:
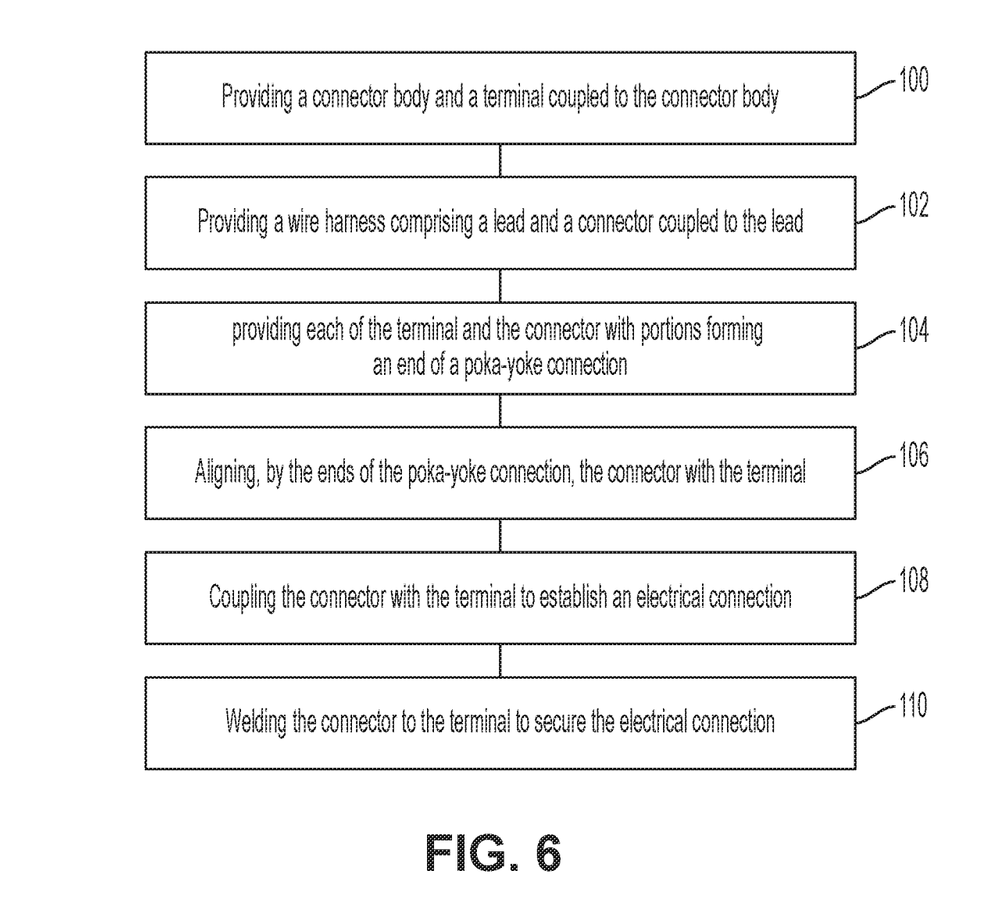
FIG. 6 is a flow chart of a method of the present invention.

The present disclosure further provides a method for forming an electrical connector. The method may comprise the step 100 of providing a connector body and a terminal coupled to the connector body. In some embodiments, the connector body and terminal may be the connector body 22 and one of the terminals 32, 34 disclosed above. The method may comprise the step 102 of providing a wire harness comprising a lead and a connector coupled to the lead. In some embodiments, the wire harness is the same as the wire harness 36 disclosed above. The method may comprise the step 104 of providing each of the terminal and the connector with portions forming an end of a poka-yoke connection. In some embodiments, the portions and poka-yoke connection may be the same as those disclosed herein.

The method may comprise the step 106 of aligning, by the ends of the poka-yoke connection, the connector with the terminal. In some embodiments, this step may be completed by a human during assembly. In some embodiments, the step may be completed by a machine, robot, or in any other manner known in the art. The method may comprise the step 108 of coupling the connector with the terminal to establish an electrical connection. The method may comprise the step 110 of welding the connector to the terminal to secure the electrical connection. The method may comprise the step of coupling a cover between and to the lead and the connector body to seal the electrical connection between the connector and the terminal from an external environment. In some embodiments, the cover is the cover 54 disclosed above.

It is contemplated that the above-described embodiments may be incorporated into a number of different applications, such as, but not limited to, vehicular applications including a wire harness or any other electrical connection.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An electrical connector assembly comprising:
   a connector body;
   a terminal coupled to the connector body;
   a wire harness comprising a lead;
   a connector coupled to the lead and to the terminal to establish an electrical connection between the lead and the terminal;
   the connector and the terminal each having a portion forming one end of a poka-yoke connection; and
   the connector and the terminal are welded to secure and maintain the respective electrical connection, wherein a key is disposed about the terminal and the key forms an end of the poka-yoke connection, wherein the key is further defined as a first terminal key extending from the connector body and disposed about the terminal.

2. The electrical connector assembly of claim 1, further comprising a cover coupled to the lead and the connector body to seal the electrical connection between connector and the terminal from an external environment.

3. The electrical connector assembly of claim 1, wherein a portion of the connector forming another end of the poka-yoke connection comprises projections arranged to be received by the key and form a pressure-fit between the connector and terminal.

4. The electrical connector assembly of claim 1, wherein the key is further defined by a recess.

5. An electrical connector assembly comprising:
   a connector body;
   a terminal coupled to the connector body;
   a wire harness comprising a lead;
   a connector coupled to the lead and to the terminal to establish an electrical connection between the lead and the terminal;
   the connector and the terminal each having a portion forming one end of a poka-yoke connection; and
   the connector and the terminal are welded to secure and maintain the respective electrical connection, wherein a key is disposed about the terminal and the key forms an end of the poka-yoke connection, wherein the key is further defined as being recessed in the connector body and disposed about the terminal.

6. The electrical connector assembly of claim 5, further comprising a cover coupled to the lead and the connector body to seal the electrical connection between connector and the terminal from an external environment.

7. The electrical connector assembly of claim 5, wherein a portion of the connector forming another end of the poka-yoke connection comprises projections arranged to be received by the key and form a pressure-fit between the connector and terminal.

8. The electrical connector assembly of claim 5, wherein the key is further defined by a recess.

9. An electrical connector assembly comprising:
a connector body;
a terminal coupled to the connector body;
a wire harness comprising a lead;
a connector coupled to the lead and to the terminal to establish an electrical connection between the lead and the terminal;
the connector and the terminal each having a portion forming one end of a poka-yoke connection; and
the connector and the terminal are welded to secure and maintain the respective electrical connection, wherein a key is disposed about the terminal and the key forms an end of the poka-yoke connection, wherein a portion of the connector comprises fingers forming a second end of the poka-yoke connection and the fingers form a pressure-fit between the connector and terminal, wherein one of the fingers comprises a hook end and a projection having a shelf extends from the connector body and the hook end forms a snap-lock with the shelf.

10. The electrical connector assembly of claim 9, wherein one of the fingers comprises a hook end and engages the shelf to form a snap-lock between the fingers and the connector body.

11. The electrical connector assembly of claim 9, further comprising a cover coupled to the lead and the connector body to seal the electrical connection between connector and the terminal from an external environment.

12. The electrical connector assembly of claim 9, wherein a portion of the connector forming another end of the poka-yoke connection comprises projections arranged to be received by the key and form a pressure-fit between the connector and terminal.

13. The electrical connector assembly of claim 9, wherein the key is further defined by a recess.

* * * * *